Nov. 16, 1926.  1,606,913
P. J. ATZBERGER
FLUID TRANSMISSION MECHANISM
Filed Nov. 20, 1919    4 Sheets-Sheet 4

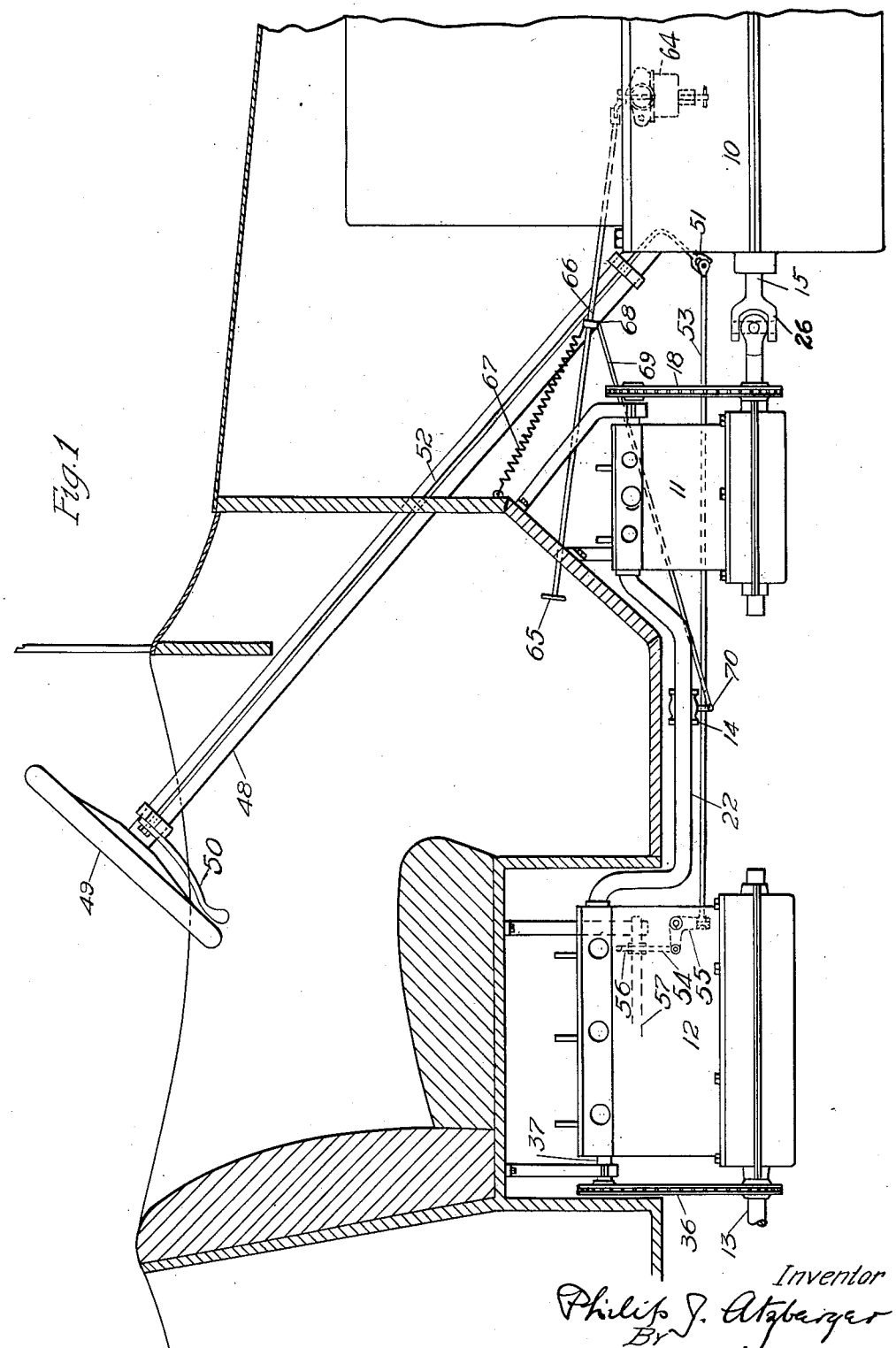

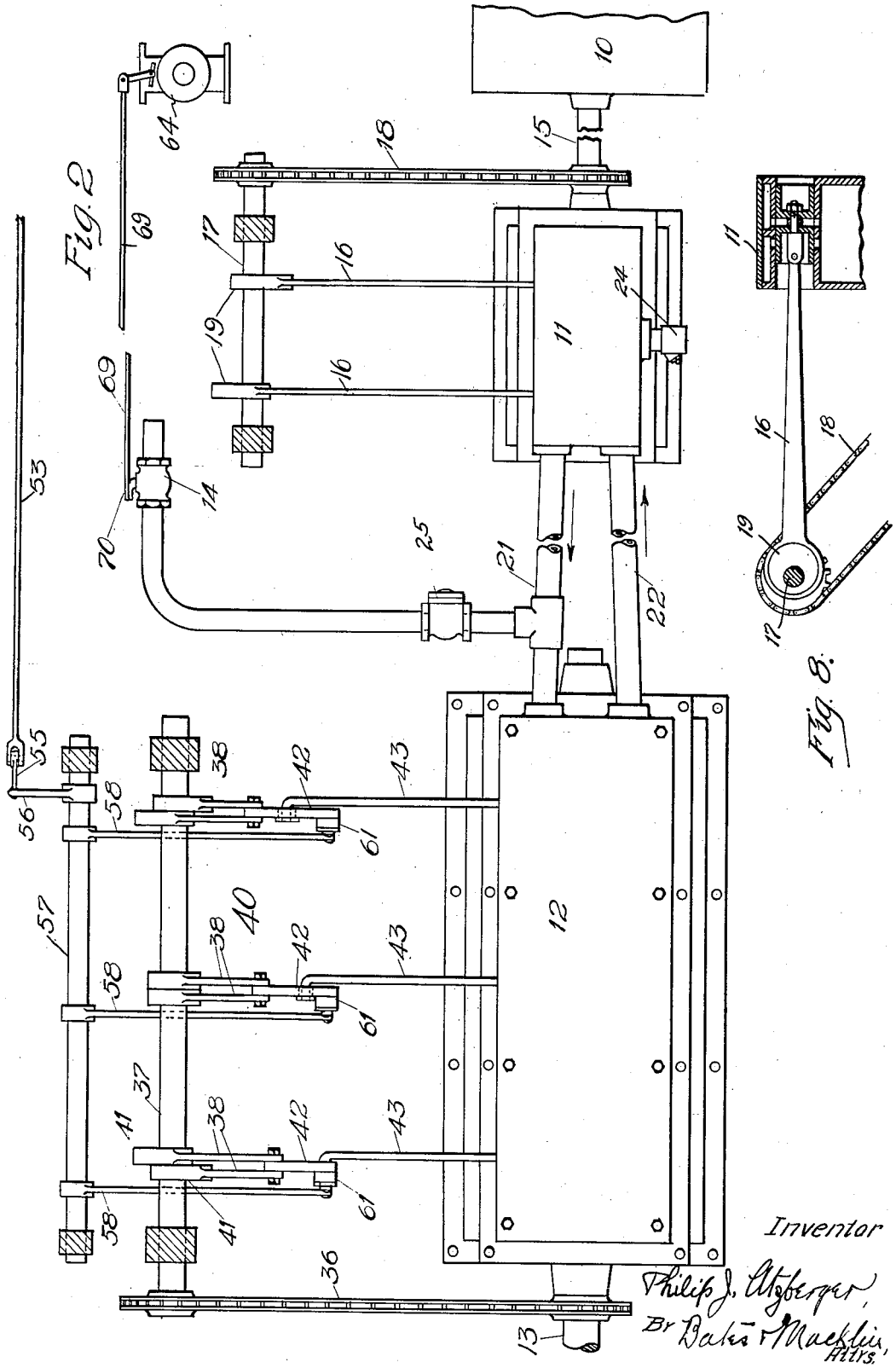

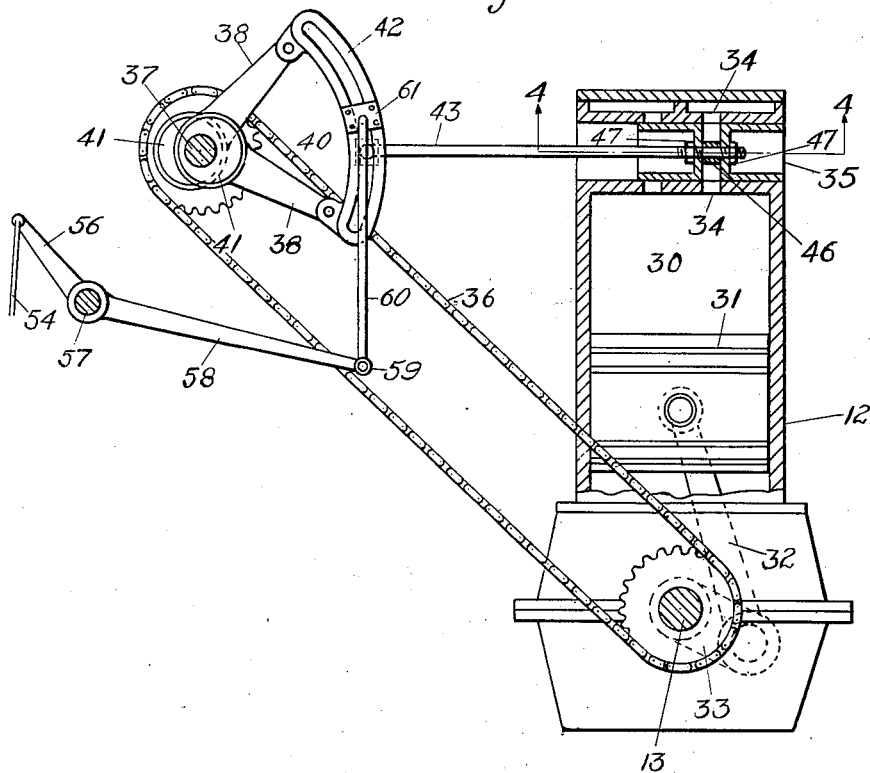

Inventor
Philip J. Atzberger,
By
Bates & Macklin, Attys.

Patented Nov. 16, 1926.

1,606,913

UNITED STATES PATENT OFFICE.

PHILIP J. ATZBERGER, OF CLEVELAND, OHIO.

FLUID TRANSMISSION MECHANISM.

Application filed November 20, 1919. Serial No. 339,460.

This invention relates to a fluid transmission mechanism particularly adapted for use in automobiles. More specifically it comprises an air pump driven from the usual internal combustion engine, an air motor for rotating the propeller shaft, a closed air circuit between the pump and motor, and manually adjusted valves for controlling the motor.

The usual gear transmission in automobiles is open to the objection of the existence of unavoidable jars or shocks and a momentary entire dropping of the load when changing gears. With an air transmission, such as I employ, the drive shaft is flexible, permitting the most gradual or sudden speed changes with no shocks or jars to the car, and without dropping the load even momentarily during the change corresponding to the gear shaft in the usual gear transmission. Furthermore, with the use of air, which is a highly compressible fluid, valves may be arranged to permit utilization of its property of expansion, when compressed, which is similar only in a lesser degree to that of steam, so that while running under light load conditions the cut-off may occur early in the stroke and the expanding air may carry part of the load and thereby reduce the fuel consumption of the engine. With the use of a closed circuit, such as I employ between the air pump and the air motor, the same air once compressed is used over and over, thereby avoiding the waste which would result if air under material pressure were discharged into the atmosphere.

The essential object of my invention is to overcome the difficulties above pointed out inherent to gear drives, and provide a flexible, elastic and economical fluid transmission between the engine and the propeller shaft.

Other objects will be apparent as the description proceeds. My invention is illustrated in the accompanying drawings, and the essential characteristics are summarized in the claims.

Figure 5:
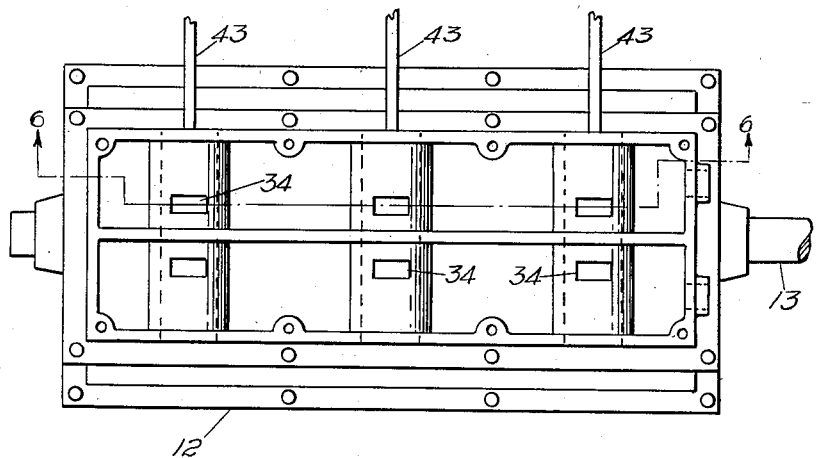
Figure 6:
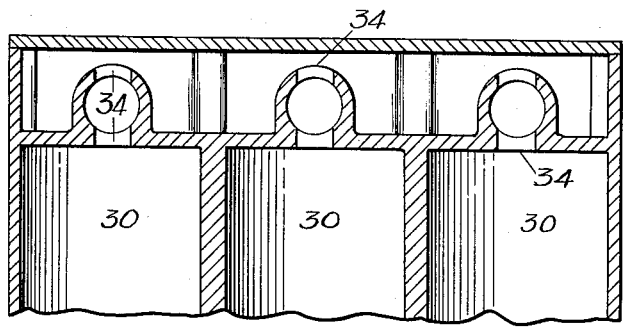
Figure 7:
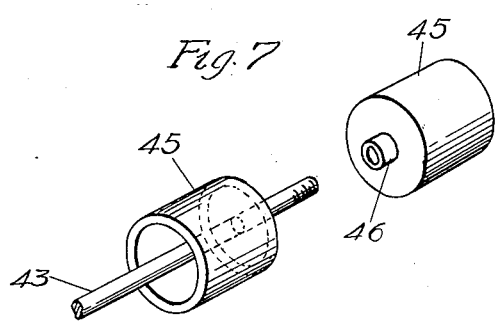

In the drawings, Fig. 1 is a longitudinal section through an automobile showing the engine, transmission and controls in side elevation; Fig. 2 is an enlarged plan of the air pump and air motor and the controlling mechanism therefor; Fig. 3 is a vertical section through the air motor and valve gearing; Fig. 4 is a horizontal section on the line 4—4 of Fig. 3; Fig. 5 is a plan of the air motor; Fig. 6 is a vertical section on the line 6—6 of Fig. 5; Fig. 7 is a perspective showing the valve construction; and Fig. 8 is a vertical section through the valve gearing of the air pump.

Referring particularly to Figs. 1 and 2, the numeral 10 designates an internal combustion engine, 11 an air pump driven thereby, and 12 an air motor operated by the air pump and in turn operating the propeller shaft 13 of the machine. The engine 10 may be an internal combustion engine of any desired type having a shaft 15 extending therefrom into and through the base of an air pump or air circulator 11. A universal joint as at 26 may be provided between the engine and pump. The air circulator 11 is shown as a single action two-cylinder pump having pistons driven in the usual manner from the shaft 15. Valve gearing comprising a shaft 17 carrying eccentrics 19 connected by eccentric straps and rods 16 with the valves, is controlled and timed from the shafts 15 and 17.

The cylinders of the air circulator 11 and the air motor 12 are connected on one side by a pipe 21 and on the other by a pipe 22. The air motor 12 is similar to the pump 11, except that it is larger in size and the one illustrated is provided with three cylinders instead of two, in order that no stalling on dead center may result, and is made reversible by suitable valve gearing to permit the machine to be run in either direction. Arranged in the pipe 21 to break the circuit between the pump 11 and motor 12 is an outlet valve 14.

When the engine is started the air circulator driven thereby pumps air through an intake check-valve 24 into the cylinders and thence through the pipe 21. After closing the valve 14 by means hereinafter described, air is forced into the cylinders of the motor 12, until it becomes sufficiently compressed to operate the same and rotate the shaft 13. When the pressure within all the portions of the circuit becomes greater than atmospheric, the check-valve 24, of course, closes.

As the air motor operates, the air is exhausted into the pipe 22 constituting the other side of the circuit between the cylinders of the pump and motor. Thus air (which may remain in the same state of compression, depending on the position of the valves, as hereinafter explained) is drawn into and forced out of the air circulator, into and out of the air motor, back and forth through the pipes 21 and 22. In this way the air after its original compression may be retained in the same state of compression and be circulated back and forth through the air pump and air motor, in a manner which may be likened to a driving belt.

Referring particularly to Figs. 3 to 6, the cylinders of the air motor are designated by the numeral 30 and are provided with the usual pistons 31, driven by the compressed air entering the cylinders through the pipe 21, and attached to the shaft 13 by connecting rods 32 and cranks 33. The cylinders are provided with the valves 35, which may be timed by valve gearing designated generally at 40. This mechanism 40 is preferably connected directly with the shaft 13 by a chain 36 passing over sprockets on the shaft 13 and on a shaft 37, and, as illustrated, comprises two eccentrics 41 on the shaft 37, pivotally connected by arms 38 to the extremities of a shiftable arcual link 42, for each cylinder. This link 42 embraces a slidable block to which is pivoted the end of a rod 43 connected to the valves 35 cooperating with the ports 34 above the cylinders.

My preferred form of valve construction is shown in Fig. 7 and comprises two cylindrical cups 45, having the usual piston rings, not shown, and having closed ends adjacent to each other, separated by a spacing collar 46. The cups 45 may be secured together against the collar 46 by nuts 47 engaging the threaded end of the rod 43, passing centrally through the cups; the assembled construction being shown most clearly in Figs. 3 and 4.

To provide for timing of the valves and consequent variation in the speed and torque of the air motor 12, and also to permit of reversing the same, I provide a connection from a controlling member, preferably on the steering column 48, Fig. 1, adjacent to the steering wheel, to the arcual links 42 of the valve gearing. This means preferably comprises a quadrant or hand lever 50 attached to a rod 52 extending along the steering column 48, and having near its lower end a rock arm at right angles and connected as by a ball and socket joint 51 with one end of a link 53. The other end of this link is loosely pivoted to one arm of a bell crank 55, the other arm being connected by a link 54 with the outer end of an arm 56 rigidly secured to a rock shaft 57. This shaft 57 has a rock arm 58 for actuating the valve gearing for each cylinder of the motor 12. The levers 58 are pivotally connected at 59 to the ends of links 60, the opposite ends of which are secured to plates 61 rigidly connected near the middle of the arcual links 42.

As will be apparent, movement of the quadrant 50 in either direction will oscillate the rod 52 and the shaft 57 through links 53 and 54, bell crank 55 and rock arm 56. Movement of the rock shaft 57 will be transmitted through rock arms 58 and links 60 to the arcual links 42, whereby the point of engagement of these links with the ends of rods 43 may be shifted from one end to the other to vary the position of the valves 35 of the motor 12, and thereby control the speed and torque of the propeller shaft or reverse its direction of movement.

The foot pedal of the accelerator is shown in Fig. 1 at 65, and is connected in the usual manner, spring pressed rearwardly at 67, by a rod 66, with the control valve of the carburetor 64 supplying the engine 10. Connected as at 68 to the rod 66, is a link 69, attached at its other end at 70 to the valve 14. When the car is standing the accelerator will be in rearward position, as illustrated in full lines in Fig. 1, and the valve 14 will be open. The initial forward movement of the accelerator 65 against the tension of the spring 67, will close the valve 14, and thereby the circuit between the pump 11 and the motor 12. Further movement of the accelerator will open the throttle and supply more gas to the carburetor in the usual manner. The usual connection between this foot control and a usual hand throttle adjacent to the steering wheel 49, may be provided, but its illustration or further description is not considered necessary, as it forms no part of my invention. It is to be understood whenever the accelerator rod 65 is in the rearward extreme position that the adjustment of the carburetor is such that the engine may be idle while the valve 14 is open. It is also to be understood that the valve 14 is sufficiently large to permit the exhaust of air from the pump 11 during such idling operation of the engine.

The operation of the system is as follows: The valve 14 being open, the engine is started in the usual manner, and through its operative connection with the pump 11 causes the pistons thereof to move up and down in their cylinders. After the engine has begun to run freely and it is desired to start the machine, the valve 14 is closed by pressing forwardly on the accelerator 65, whereupon air from the cylinders of the pump 11 is then forced through the pipe 21 into the various cylinders of the motor 12, according to the operation of the valves 35. The air is there compressed, more being drawn into the pump through the inlet valve 24 until further effort by the pump or circulator to compress it will overcome the load on the air motor and move the pistons in the cylinders of the motor and thereby rotate the shaft 13, and move the car.

The exhaust air from the air motor will pass through the pipe 22 back to the circulator 11, and being compressed, will maintain the intake check-valve 24 closed. As the air pump 11 continues to operate, the air will be circulated, and may be at the same state of compression, through the pump and motor and connecting pipes 21 and 22. Any increase in the load, due to road conditions or other causes, will occasion the transfer of additional air from the exhaust side 22 of the system into the compression side. It will be understood that the check-valve 24 will open and admit additional air should the pressure in the exhaust side 22 be reduced below atmospheric pressure. Thus, sufficient air can always be introduced into the compression side 21 to overcome the load on the air motor, provided this load is not too great for the engine 10 to carry. A safety valve 25, is provided to open if the load becomes too great, or if the valves of the motor are left at neutral, thereby preventing the stalling of the engine.

When the car is running, the accelerator 65 may be held forwardly in its first stage of movement, or set in such position from the steering wheel 49 as desired. When it is desired to stop the car the rod 66 is allowed to return to its rearward position under the influence of the spring 67, thereby opening the valve 14 and breaking the circuit between the air pump 11 and motor 12. Stopping may also be effected by setting the valve gearing at neutral.

The speed and power delivered may be controlled as desired, to meet varying road conditions, by operation of the quadrant lever 50 to control the valves 35 of the air motor and vary the time of cut-off. When the machine is running on substantially level road the speed desired may be relatively high and the requisite torque low. Accordingly the valves 35 will be advanced to give an early cut-off in the air supply to the cylinders 30, and the air will accordingly work expansively increasing the speed of the motor 12 and correspondingly decreasing the torque. In hill climbing, on the other hand, speed will be sacrificed to secure greater power and the valves will be set to make the cut-off occur late in the stroke, whereby the air will work under practically constant compression, thereby giving maximum torque.

It will be observed that the early and late cut-off correspond to high and low gear in the ordinary gear transmission, while there may be an indefinite number of intermediate positions greatly in excess of what is feasible for intermediate gearing. The pump 11, of course, will operate constantly at engine speed in view of its direct connection, but inasmuch as it is made considerably smaller than the motor 12, its small pistons will drive the larger ones of the air motor at a slower rate, unless the cut-off is made early, whereby the speed of the latter is increased. This difference in piston area in the pump and motor corresponds to the difference in size between two meshing gears of a gear transmission, and is made great enough so that with an early cut-off the speed of the motor 12, due to the expansive action of the air, may equal approximately that of the engine-driven pump, and the air motor will run at practically the same speed as the engine 10, as is usual with the direct high-gear connection in gear transmission. As the valves are changed to give a later cut-off the effect is to reduce the speed of the motor 12 with a corresponding increase in its torque, analogous to a shift to lower gear in a gear transmission system, but having the advantage of an uninterrupted gradual change.

To reverse the car the hand lever 50 will be operated to shift the arcual links 42 past neutral position, thereby reversing the motor 12.

From the foregoing it will be apparent that I have provided a transmission that is extremely simple in operation and efficient and economical in use, and does away entirely with the unsatisfactory characteristics of slidable gearing. The parts occupy but little space and may be conveniently mounted beneath the front seat of the machine and adjacent to the engine, as illustrated in Fig. 1, readily accessible for any adjustment or repairs that may be necessary.

I claim:

1. A fluid transmission system between an internal combustion engine and a driven shaft, comprising an air pump driven by the engine and an air motor driving said shaft, a transmitting and a return air passageway between said pump and said motor, inlet and outlet valves within said passageways for controlling the air supply, said inlet valve communicating with said return passageway, and being automatically operated by changes in air pressure, and said outlet valve being manually controlled and communicating with the transmitting passageway.

2. A fluid transmission system between an internal combustion engine and the propeller shaft of an automobile, comprising an air pump driven by the engine and an air motor driving said shaft, an air circuit between said pump and said motor, an outlet valve in said circuit for controlling the air supply within said circuit, said outlet valve being coupled with the throttle of the engine and controlled thereby.

3. A fluid transmission system between an internal combustion engine and the propeller shaft of an automobile comprising an air pump driven by the engine and an air motor for driving said shaft, air passageways between said pump and said motor, inlet and outlet valves for controlling the air supply within said passageways, said inlet valve being automatically operated by changes of pressure and said outlet valve being connected with the accelerator of the machine and controlled thereby.

4. In a fluid transmission system between an internal combustion engine and a driven shaft, an air pump driven from said engine through a universal joint in the interconnecting shafting, and an air motor adapted to rotate said driven shaft, said air motor being driven by said air pump through a closed circuit between said pump and motor, valves within said circuit for controlling the air supply, one being automatically and the other manually operated.

5. The combination with an internal combustion engine and the propeller shaft of an automobile, of means for transmitting the energy developed by the engine to the shaft, said means comprising an air pump driven by the engine shaft, a reciprocating air motor arranged to rotate said shaft, means forming a closed circuit between the air pump and the air motor, a valve within said air circuit, a lever controlling the speed of the engine, and means for so connecting the valve and lever that the valve is maintained closed so long as the engine is operating at a predetermined speed.

6. In combination with an internal combustion engine and the propeller shaft of an automobile, of means for transmitting the energy developed by the engine to said shaft, a lever for controlling the flow of fuel to said engine, said means comprising an air pump driven by the engine shaft, an air motor arranged to rotate the shaft, means forming a closed circuit between the air pump and the air motor, inlet and outlet valves controlling the air supply within said circuit said outlet valve being operatively connected to said lever whereby the valve is open when the engine is operating at idling speed, and whereby the valve is closed when the engine is operating at a higher speed.

7. The combination with an internal combustion engine and the propeller shaft of an automobile, of means for transmitting the energy developed by the engine to said shaft, said means including an air pump and an air motor in a closed circuit, the pump being driven by the engine, and the motor driving the propeller shaft, valves within said circuit for controlling the air supply, one of said valves being operatively connected to the throttle of the engine, whereby the circuit is opened automatically to the atmosphere whenever the engine speed is reduced to a predetermined amount, valve gearing for the motor, and means for manually varying the time of cut-off for said valve.

In testimony whereof, I hereunto affix my signature.

PHILIP J. ATZBERGER.